H. W. BELL.
SPRING SUSPENSION.
APPLICATION FILED JULY 10, 1920.
1,427,185.
Patented Aug. 29, 1922.
2 SHEETS—SHEET 1.
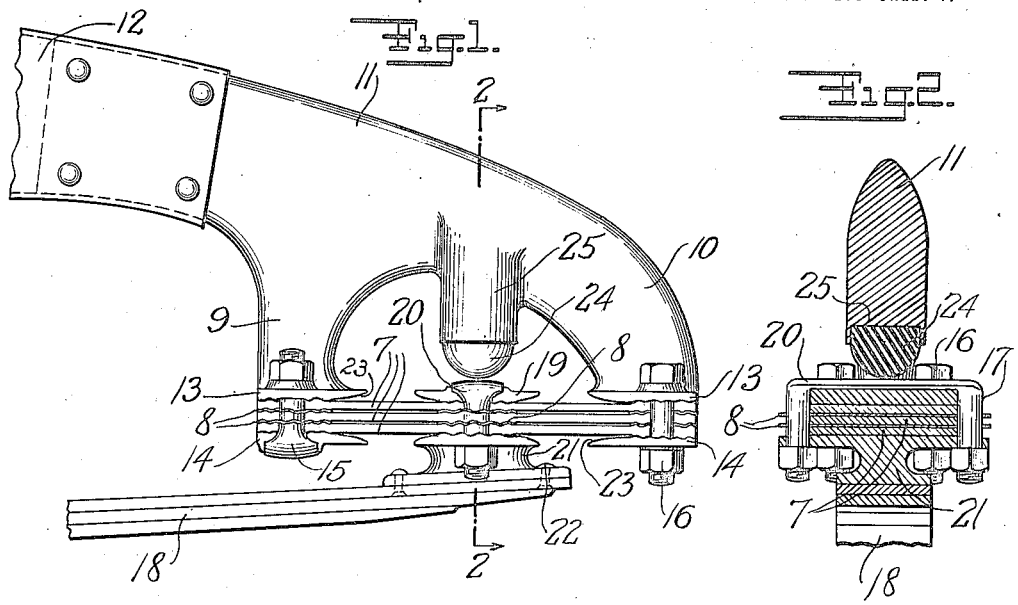
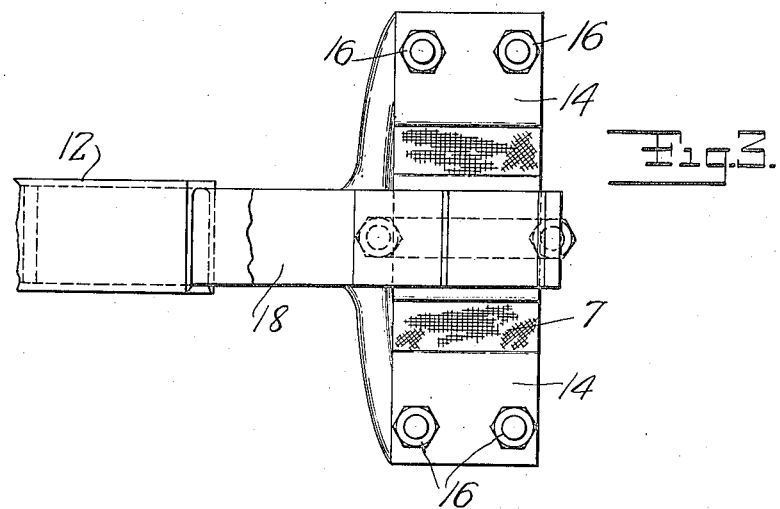
Inventor
Harvey W. Bell
By his Attorney
E. W. Marshall

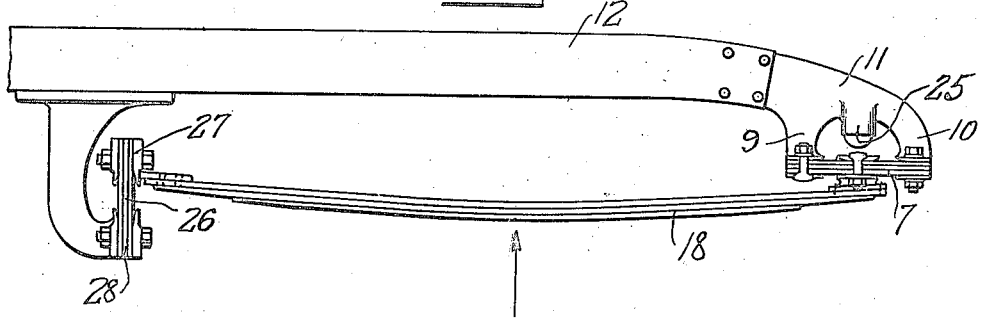
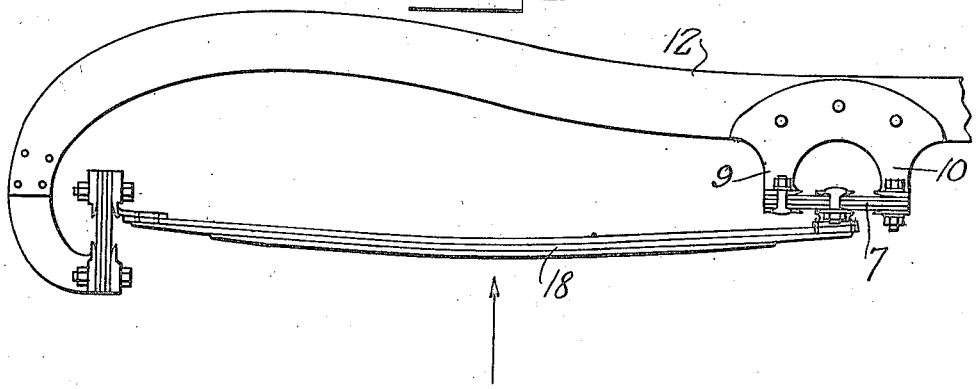
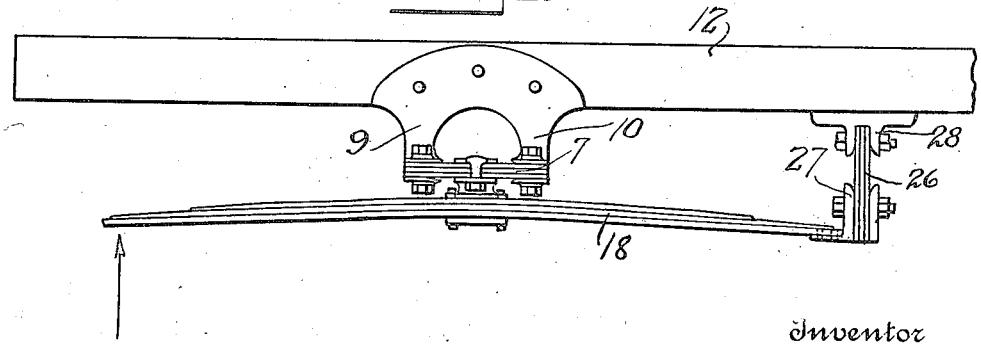

UNITED STATES PATENT OFFICE.

HARVEY W. BELL, OF YONKERS, NEW YORK, ASSIGNOR TO THE BELOYT CORPORATION, OF DOVER, DELAWARE, A CORPORATION OF DELAWARE.

SPRING SUSPENSION.

1,427,185.　　　　　　Specification of Letters Patent.　　Patented Aug. 29, 1922.

Application filed July 10, 1920. Serial No. 395,266.

*To all whom it may concern:*

Be it known that I, HARVEY W. BELL, a citizen of the United States of America, and a resident of Yonkers, Westchester County, and State of New York, have invented certain new and useful Improvements in Spring Suspensions, of which the following is a specification.

This invention relates to the couplings between the supporting springs and the vehicle bodies of motor cars.

The objects of the invention are to provide a pivoting connection between the springs and car body which will allow the necessary freedom of pivotal movement, but which will restrain sidewise or fore and aft movements, which will be noiseless in its operation and will require no lubrication or other special attention.

Other objects are to provide a coupling of this character which will be relatively simple and strong, durable and lasting, practical and inexpensive and which will add to the easy riding qualities of the car.

These various objects I have accomplished by certain novel features of construction, combinations and relations of parts, as will be hereinafter described.

In the accompanying drawings I have illustrated the invention embodied in several different forms and used in various relations, but wish it understood that the invention may be modified in structure and be adapted to other than the uses illustrated, without departure from the true spirit and broad scope of the invention.

In the drawings referred to:

Figure 1 is a broken view of a form of the device used as a front end spring connection.

Figure 2 is a vertical sectional view of the same, as taken on substantially the plane of line 2—2 of Figure 1.

Figure 3 is a bottom and broken plan view of the construction of Figure 1, modified to the extent that the flexible supporting link is turned at a right angle instead of parallel to the spring.

Figures 4, 5 and 6 are more or less diagrammatic views illustrating the use of the invention in different relations and with different types of spring suspension, Figure 4 being a completed view of the front end spring suspension of Figure 1, Figure 5 being a similar view of a typical rear end suspension and Figure 6 illustrating a suspension of the cantilever type.

In my present invention, a pivotal connection is afforded between the spring and the vehicle body by a substantially horizontally disposed link which is rigidly secured at is opposite ends to one of the members to be coupled and which is rigidly engaged by the other member at its intermediate portion. This link is preferably made of "thermoid" or material of a similar character, which is freely flexible in a direction transverse to its flat plane, but which is strongly resistant to flexure in its own plane.

In Figure 1 I have shown the flexible link as made up of a plurality of superposed strips 7 secured in spaced apart relation by interposed clamping washers 8. These strips are rigidly clamped at their opposite ends to the arms 9, 10 of an arch shaped bracket 11 which, in this particular instance, is secured to the side sill or frame member 12 of the vehicle.

The clamps for the ends of the link are afforded in the present illustration by providing pads 13 at the ends of the arms of the yoke or arch with which cooperate the movable clamp plates 14, said movable plates being secured by suitable fastening bolts 15 or 16. Fastenings 15 are shown in the form of U-bolts extending about the flexible strips and fastenings 16 are shown in the form of through bolts extending through said strips, this for the purpose of illustrating how both forms of fastenings may be employed. The spacing washers are preferably positively held against shifting by passing the fastening bolts therethrough, as I have indicated at 17. 18 designates a front spring of the so-called semi-elliptic type. The front end of this spring is rigidly secured to the intermediate portion of the flexible link between the rigidly held ends thereof by a clamp consisting of a clamp plate 19 secured by the U-bolt 20 to the bracket or pad 21 which is suitably secured to the upper leaf of the spring as by means of rivets 22. The spacing washers 8 may be also interposed between the layers of the link at this intermediate clamp.

The clamps are shown formed with flaring or curved bearings 23 for the flexure of the adjacent free portions of the strips so as to avoid abrasion or cutting of the strips at the points of emergence from the clamps.

This construction allows for the necessary freedom of pivotal movement for the front end of the spring and at the same time effectually overcomes the tendencies to fore and aft and lateral swaying movements. The flexible sustaining link is initially stretched flat and put under sufficient tension to enable it to resist these movements which it is desired to control, but this tension is not sufficient to stop the pivotal movements described.

The sustaining link may stretch or "sag" somewhat with long continued usage and to take care of this possibility, I have provided a bumper or cushioning member at 24 seated in a socket 25 in the arch bracket directly above the intermediate clamp and arranged to be engaged thereby. This bumper may be made of rubber or other material and serves as a check to the stretching movement of the link and also at times may serve to take the whole or a part of the load off this link, to thereby operate as a supplemental bearing.

In the first construction illustrated, the sustaining link extends longitudinally or parallel to the spring. This link may, however, be turned around at an angle to the spring, as indicated generally in Figure 3. This construction has certain advantages, particularly in checking side sway.

In Figure 4 I have illustrated a complete front spring installation in which the front end of the spring is connected with the frame by the yielding pivotal coupling described and which the rear end of this spring is connected with the frame by means of a suspension link 26, of the type disclosed in my co-pending application, Serial No. 363,189, and which is rigidly secured at one end to the spring by a clamp 27 and is rigidly secured to the frame at its opposite end by a clamp 28. This link will flex freely in a direction at right angles to its flat plane and like the links first herein described, resist sidewise or lateral movement in the direction of its flat plane. The combination of these two couplings provides an extremely flexible mounting which allows free movement of the spring and restrains the lateral and other objectionable movements.

In Figure 5 I have shown the same relation of couplings applied to a rear spring of semi-elliptic form. In this case, however, the suspension link is located at the rear end of the frame and the pivoting link is used to connect the front end of the spring with an intermediate portion of the frame.

In Figure 6 I have illustrated the invention as applied to a spring of the cantilever type. Here the intermediate portion of the spring is coupled to the frame by one of the pivoting sustaining links and the forward end of the spring is connected with the frame by means of one of the flexible suspension links. In each of Figures 4, 5 and 6, the direction of the wheel thrust is indicated by the arrow.

What I claim is:

1. The combination with the supporting members of a vehicle body, of a coupling between said two members and comprising a flexible link rigidly secured and fixedly held at its opposite ends to one of said members and a connection between the other member and the intermediate portion of the flexible link between the rigidly held ends thereof.

2. A coupling for vehicle bodies and springs comprising an arched bracket for attachment to one of the members to be coupled and provided with clamps at the opposite ends thereof, a substantially flat flexible link rigidly held at its opposite ends by said clamps and a clamp for rigidly securing the other member to the intermediate portion of the flexible link.

3. A coupling for vehicle bodies and springs comprising an arched bracket for attachment to one of the members to be coupled and provided with clamps at the opposite ends thereof, a substantially flat flexible link rigidly held at its opposite ends by said clamps, a clamp for rigidly securing the other member to the intermediate portion of the flexible link and a cushioning element carried by the arched bracket and positioned to be engaged by the intermediate clamp aforesaid.

4. The combination with a vehicle body and a supporting spring therefor, of a coupling for said members comprising a substantially horizontal flat link flexible transversely to the flat plane thereof but strongly resistant to flexure in the plane thereof, means for rigidly securing the opposite ends of said link to one of the members and means for rigidly connecting the other member to said link at a point between the rigidly held ends thereof.

5. The combination with a vehicle body and a supporting spring therefor, of a coupling for said members comprising a substantially horizontal flat link flexible transversely to the flat plane thereof but strongly resistant to flexure in the plane thereof, means for rigidly securing the opposite ends of said link to one of the members, means for rigidly connecting the other member to said link at a point between the rigidly held ends thereof and a bumper positioned to receive the thrust of the intermediate connection aforesaid.

6. The combination of a vehicle body and a supporting spring, of a coupling for said members comprising a substantially horizontal flat link flexible transversely of the plane thereof and resistant to flexure in its own plane, means for rigidly securing the opposite ends of said link to one of the members, means for rigidly securing the other member to the link at a point between the rigidly held ends thereof and means for automatically relieving said link of a portion of the load thereon.

7. A pivotal connection between the spring and body of a vehicle comprising a substantially horizontal relatively flat link strongly resistant to flexure in the flat plane thereof but flexible in a plane transverse thereto, means for rigidly securing the opposite ends of said link to one of the members aforesaid and with the link stretched out flat under tension and means for rigidly securing the other member to the intermediate portion of the link between the rigidly held ends thereof, whereby said intermediate connection may pivot to the extent permitted by the transverse flexure of the link but is restrained against lateral shifting movement by the non-flexible character of the link in the flat plane thereof.

8. A pivotal connection between the spring and body of a vehicle comprising a substantially horizontal relatively flat link strongly resistant to flexure in the flat plane thereof but flexible in a plane transverse thereto, means for rigidly securing the opposite ends of said link to one of the members aforesaid and with the link stretched out flat under tension, means for rigidly securing the other member to the intermediate portion of the link between the rigidly held ends thereof, whereby said intermediate connection may pivot to the extent permitted by the transverse flexure of the link but is restrained against lateral shifting movement by the non-flexible character of the link in the flat plane thereof and means for automatically relieving said link of a portion of the load in the event of sagging or overloading of the same.

9. A pivotal connection between the spring and body of a vehicle comprising a substantially horizontal relatively flat link strongly resistant to flexure in the flat plane thereof but flexible in a plane transverse thereto, means for rigidly securing the opposite ends of said link to one of the members aforesaid and with the link stretched out flat under tension and means for rigidly securing the other member to the intermediate portion of the link between the rigidly held ends thereof, whereby said intermediate connection may pivot to the extent permitted by the transverse flexure of the link but is restrained against lateral shifting movement by the non-flexible character of the link in the flat plane thereof, said pivotal connection serving to couple one end of the spring to the vehicle body and a suspension connection between the opposite end of the spring and the vehicle body consisting of a substantially flat vertically disposed link rigidly secured at one end to the spring and rigidly secured at the opposite end to the vehicle body, said link also being resistant to flexure in the plane thereof but flexible transversely to such plane.

10. The combination with a vehicle body and a supporting spring therefor, of a coupling between one end of the spring and the vehicle body comprising a relatively flat suspension link rigidly held at its opposite ends and substantially non-flexible in the plane thereof but freely flexible in a plane transverse to the flat plane and a pivoting connection between the opposite end of the spring and the vehicle body comprising a relatively flat substantially horizontally disposed flexible link rigidly held at its opposite ends to one of the members and rigidly connected at a point intermediate its ends to the other member.

11. The combination with a vehicle body and a supporting spring therefor, of a coupling between one end of the spring and the vehicle body comprising a relatively flat suspension link rigidly held at its opposite ends and substantially non-flexible in the plane thereof but freely flexible in a plane transverse to the flat plane, a pivoting connection between the opposite end of the spring and the vehicle body comprising a relatively flat substantially horizontally disposed flexible link rigidly held at its opposite ends to one of the members and rigidly connected at a point intermediate its ends to the other member and means for automatically cushioning excessive movements of said intermediate connection.

12. A coupling for vehicle bodies and springs comprising a flat link flexible transversely to the plane thereof and substantially non-flexible in its own plane, means for rigidly securing the opposite ends of said flexible link in substantially horizontal relation to one of the members to be coupled, means for rigidly connecting the other member to the intermediate portion of said link and a bearing for said intermediate portion of the link.

In witness whereof, I hereunto set my hand this 8th day of July, 1920.

HARVEY W. BELL.